US012767138B2

(12) United States Patent
Hutton

(10) Patent No.: US 12,767,138 B2
(45) Date of Patent: Oct. 20, 2026

(54) SYSTEMS AND METHODS FOR EXTERNAL ACTOR ACKNOWLEDGMENT FOR AUTOMATED VEHICLES

(71) Applicant: TORC Robotics, Inc., Blacksburg, VA (US)

(72) Inventor: Brett Hutton, Blacksburg, VA (US)

(73) Assignee: Torc Robotics, Inc., Blacksburg, VA (US)

( * ) Notice: Subject to any disclaimer, the term of this patent is extended or adjusted under 35 U.S.C. 154(b) by 243 days.

(21) Appl. No.: 18/125,346

(22) Filed: Mar. 23, 2023

(65) Prior Publication Data

US 2024/0317231 A1 Sep. 26, 2024

(51) Int. Cl.
*B60W 30/18* (2012.01)
*B60Q 1/34* (2006.01)

(52) U.S. Cl.
CPC ....... *B60W 30/18163* (2013.01); *B60Q 1/346* (2013.01); *B60W 2420/403* (2013.01); *B60W 2420/408* (2024.01); *B60W 2552/10* (2020.02); *B60W 2554/4041* (2020.02); *B60W 2554/4042* (2020.02); *B60W 2554/4045* (2020.02)

(58) Field of Classification Search
CPC ... B60W 30/18163; B60W 2554/4041; B60W 2554/4042; B60W 2554/4045; B60W 2552/10; B60W 2420/408; B60W 2420/403; B60Q 1/346
See application file for complete search history.

(56) References Cited

U.S. PATENT DOCUMENTS

2014/0309855 A1* 10/2014 Tran ........................ B60Q 1/346 701/36
2017/0057407 A1* 3/2017 Gee ........................ B60Q 1/503
2018/0275650 A1* 9/2018 Nelson ..................... B62J 50/25
2019/0011916 A1* 1/2019 Alvarez Rodriguez .. B60R 1/26
2019/0054922 A1* 2/2019 Yalla ..................... B60W 10/20
2020/0050195 A1* 2/2020 Gross .................... B60W 10/08
2020/0269745 A1* 8/2020 Iwasaki .................. B60Q 1/346
2021/0107476 A1* 4/2021 Cui ................. B60W 60/00276
2022/0379924 A1* 12/2022 Foster ................... B60W 30/16

FOREIGN PATENT DOCUMENTS

WO WO-2017069740 A1 * 4/2017 ............... B60Q 1/32

* cited by examiner

*Primary Examiner* — Scott A Browne
*Assistant Examiner* — Jason Nguyen
(74) *Attorney, Agent, or Firm* — Armstrong Teasdale LLP

(57) ABSTRACT

A method and vehicle for external actor acknowledgment for automated vehicles is disclosed. In an example, a method comprises determining, by a processor, to control a vehicle to switch into a lane adjacent to the vehicle; monitoring, by the processor, a speed or a location of a second vehicle, the second vehicle in the lane adjacent to the vehicle; determining, by the processor, the speed or the location of the second vehicle satisfies a condition; controlling, by the processor, the vehicle to switch into the lane adjacent to the vehicle; and activating, by the processor, an acknowledgment sequence responsive to determining the vehicle has switched into the lane.

17 Claims, 6 Drawing Sheets

500

SYSTEMS AND METHODS FOR EXTERNAL ACTOR ACKNOWLEDGMENT FOR AUTOMATED VEHICLES

TECHNICAL FIELD

The present disclosure relates generally to automated vehicles and, more specifically, to systems and methods for automated vehicle operation.

BACKGROUND

The use of automated vehicles has become increasingly prevalent in recent years, with the potential for numerous benefits, such as improved safety, reduced traffic congestion, and increased mobility for people with disabilities. Part of being a good citizen of the road is showing appreciation or acknowledgment to other external actors (e.g., other vehicles). For example, a human may express appreciation to another vehicle by waiving or nodding when the vehicle creates extra space for them to make a desired lane change or merge. Truck drivers may do this at times by using a marker interrupt to flash marker lamps a number of times as a common practice to express appreciation.

SUMMARY

An automated (e.g., autonomous) vehicle system may not be able to express appreciation in the same manner as humans. For example, part of being a good citizen of the road, whether the actor is human or robotic, is expressing appreciation at times. In some cases, it may be common for a human to express appreciation (e.g., say thank you) by waiving or nodding when another human makes extra room (e.g., creates space) for them to make a desired lane change or merge. This action may constitute a good deed. Truck drivers may express appreciation in a similar scenario by flashing marker lamps a number of times (e.g., three times). However, self-driving vehicles (SDVs), such as trucks or other vehicles, may have difficulties recognizing these scenarios and expressing appreciation. The lack of appreciation may result in upset drivers on the road, which may cause reduced occurrence of these scenarios and an overall reduced experience of interactions with SDVs.

A computer implementing the systems and methods described herein may overcome the aforementioned technical deficiencies. For example, the computer may operate to activate an acknowledgment procedure for expressing appreciation. In some cases, the computer may determine to control an SDV to switch into another lane. The computer may monitor a speed or a location of another vehicle and determine that the speed or location of the other vehicle satisfies a condition (e.g., the other vehicle has created sufficient space for the SDV). The computer may control the SDV to switch into the other lane and activate an acknowledgment sequence to express appreciation to the other vehicle.

To activate the acknowledgment sequence, the computer may activate a lamp. For example, the computer may activate one or more marker lamps located at a back surface of the SDV (e.g., a taillight). In some examples, to follow common roadway practice, the computer may activate and deactivate the marker lamps (e.g., flash) a number of times (e.g., three times). In some examples, the computer may activate the acknowledgment sequence responsive to detecting an indication of intent from the other vehicle (e.g., flashing lights from the other vehicle to indicate it intentionally created space for the SDV to merge).

The techniques described herein may result in various advantages over the aforementioned technical deficiencies. For example, adopting the acknowledgment procedure may allow for improved interactions with external actors (e.g., other vehicles of the road) by showing appreciation, improved social acceptance of SDVs, and improved "behavior" of SDVs by following common roadway practice, among other advantages.

At least one aspect is directed to a vehicle. The vehicle can include one or more processors. The one or more processors can be configured to determine to switch the vehicle into a lane adjacent to the vehicle; responsive to determining to switch the vehicle into the lane, monitor a speed or a location of a second vehicle, the second vehicle in the lane adjacent to the vehicle; determine the speed or the location of the second vehicle satisfies a condition; responsive to determining the condition is satisfied, control the vehicle to switch into the lane adjacent to the vehicle; and activate an acknowledgment sequence responsive to determining the vehicle has switched into the lane.

At least one aspect is directed to a method. The method may include determining, by one or more processors, to switch the vehicle into a lane adjacent to the vehicle; responsive to determining to switch the vehicle into the lane, monitor, by the one or more processors, a speed or a location of a second vehicle, the second vehicle in the lane adjacent to the vehicle; determine, by the one or more processors, the speed or the location of the second vehicle satisfies a condition; responsive to determining the condition is satisfied, control, by the one or more processors, the vehicle to switch into the lane adjacent to the vehicle; and activate, by the one or more processors, an acknowledgment sequence responsive to determining the vehicle has switched into the lane.

At least one aspect is directed to a non-transitory computer readable medium that can include one or more instructions stored thereon that are executable by a processor. The processor can determine to switch the vehicle into a lane adjacent to the vehicle; responsive to determining to switch the vehicle into the lane, monitor a speed or a location of a second vehicle, the second vehicle in the lane adjacent to the vehicle; determine the speed or the location of the second vehicle satisfies a condition; responsive to determining the condition is satisfied, control the vehicle to switch into the lane adjacent to the vehicle; and activate an acknowledgment sequence responsive to determining the vehicle has switched into the lane.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION

Figure 1:
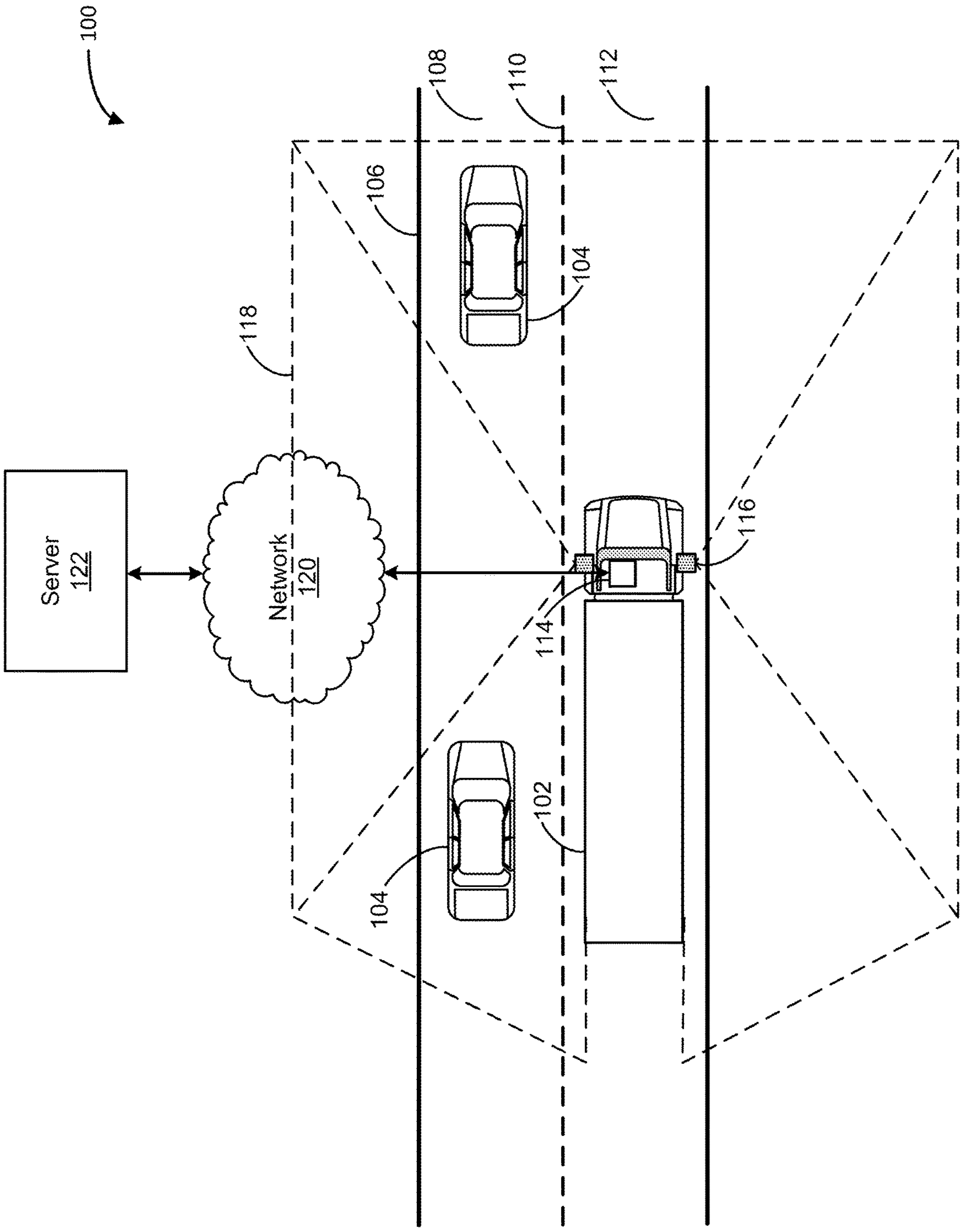
FIG. 1 is a bird's eye view of a roadway including a schematic representation of a vehicle and aspects of an autonomy system of the vehicle, according to an embodiment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

Referring to FIG. 1, the present disclosure relates to automated vehicles, such as an automated vehicle 102 having an autonomy system 114. The autonomy system 114 of the vehicle 102 may be completely automated (e.g., fully-autonomous), such as self-driving, driverless, or Level 4 autonomy, or semi-autonomous, such as Level 3 autonomy. As used herein, the term "automated" or "autonomous" includes both fully-autonomous and semi-autonomous. The present disclosure sometimes refers to automated vehicles as ego vehicles. The autonomy system 114 may be structured on at least three aspects of technology: (1) perception, (2) maps/localization, and (3) behaviors planning and control. The function of the perception aspect is to sense an environment surrounding the vehicle 102 and interpret the environment. To interpret the surrounding environment, a perception module 116 or engine in the autonomy system 114 of the vehicle 102 may identify and classify objects or groups of objects in the environment. For example, a perception module 116 may be associated with various sensors (e.g., light detection and ranging (LiDAR), camera, radar, etc.) of the autonomy system 114 and may identify one or more objects (e.g., pedestrians, vehicles, debris, etc.) and features of the roadway (e.g., lane lines) around the vehicle 102, and classify the objects in the road distinctly.

The maps/localization aspect of the autonomy system 114 may be configured to determine where on a pre-established digital map the vehicle 102 is currently located. One way to do this is to sense the environment surrounding the vehicle 102 (e.g., via the perception module 116) and to correlate features of the sensed environment with details (e.g., digital representations of the features of the sensed environment) on the digital map.

Once the systems on the vehicle 102 have determined its location with respect to the digital map features (e.g., location on the roadway, upcoming intersections, road signs, etc.), the vehicle 102 can plan and execute maneuvers and/or routes with respect to the features of the digital map. The behaviors, planning, and control aspects of the autonomy system 114 may be configured to make decisions about how the vehicle 102 should move through the environment to get to its goal or destination. The autonomy system 114 may consume information from the perception and maps/localization modules to know where the vehicle 102 is relative to the surrounding environment and what other objects and traffic actors are doing.

FIG. 1 further illustrates an environment 100 for modifying one or more actions of the vehicle 102 using the autonomy system 114. The vehicle 102 is capable of communicatively coupling to a remote server 122 via a network 120. The vehicle 102 may not necessarily connect with the network 120 or the server 122 while the vehicle 102 is in operation (e.g., driving down the roadway). That is, the server 122 may be remote from the vehicle, and the vehicle 102 may deploy with all the necessary perception, localization, and vehicle control software and data necessary to complete its mission fully-autonomously or semi-autonomously.

While this disclosure refers to a vehicle 102 as an automated vehicle, it is understood that the vehicle 102 could be any type of vehicle including a truck (e.g., a tractor trailer), an automobile, a mobile industrial machine, etc. While the disclosure will discuss a self-driving or driverless automated system, it is understood that the automated system could alternatively be semi-autonomous having varying degrees of autonomy or autonomous functionality. While the perception module 116 is depicted as being located at the front of the vehicle 102, the perception module 116 may be a part of a perception system with various sensors placed at different locations throughout the vehicle 102.

Figure 2:
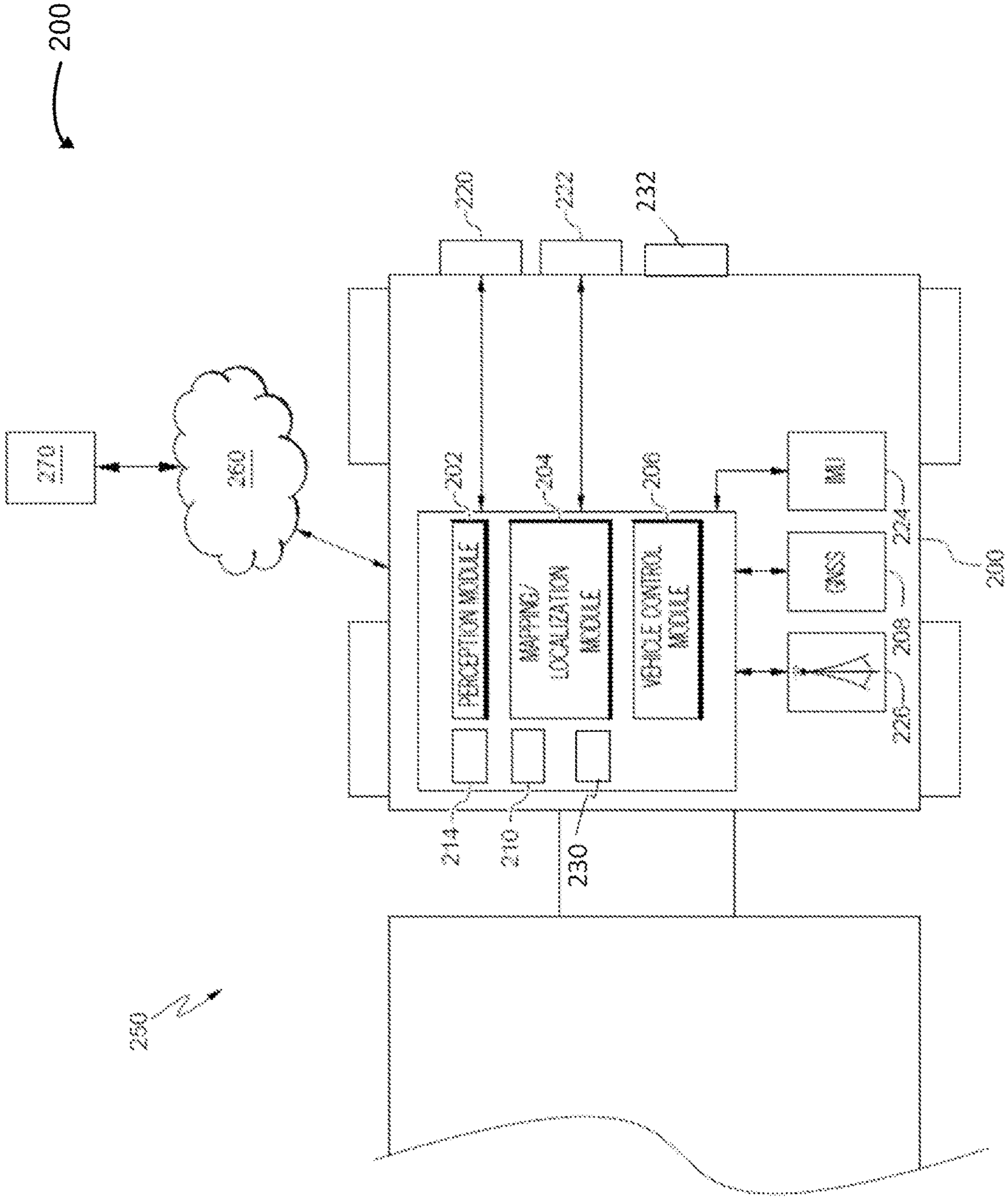
FIG. 2 is a schematic of an autonomy system of a vehicle, according to an embodiment.

FIG. 2 illustrates an example schematic of an autonomy system 250 of a vehicle 200, according to some embodiments. The autonomy system 250 may be the same as or similar to the autonomy system 114. The autonomy system 250 may include a perception system including a camera system 220, a LiDAR system 222, a radar system 232, a GNSS receiver 208, an inertial measurement unit (IMU) 224, and/or a perception module 202. The autonomy system 250 may further include a transceiver 226, a processor 210, a memory 214, a mapping/localization module 204, and a vehicle control module 206. The various systems may serve as inputs to and receive outputs from various other components of the autonomy system 250. In other examples, the autonomy system 250 may include more, fewer, or different components or systems, and each of the components or system(s) may include more, fewer, or different components. Additionally, the systems and components shown may be combined or divided in various ways. As shown in FIG. 1, the perception systems aboard the automated vehicle may help the vehicle 102 perceive its environment out to a perception area 118. The actions of the vehicle 102 may depend on the extent of the perception area 118. It is to be understood that the perception area 118 is an example area, and the practical area may be greater than or less than what is depicted.

The camera system 220 of the perception system may include one or more cameras mounted at any location on the vehicle 102, which may be configured to capture images of the environment surrounding the vehicle 102 in any aspect or field of view (FOV). The FOV can have any angle or aspect such that images of the areas ahead of, to the side, and behind the vehicle 102 may be captured. In some embodiments, the FOV may be limited to particular areas around the vehicle 102 (e.g., forward of the vehicle 102) or may surround 360 degrees of the vehicle 102. In some embodiments, the image data generated by the camera system(s) 220 may be sent to the perception module 202 and stored, for example, in memory 214.

The LiDAR system 222 may include a laser generator and a detector and can send and receive LiDAR signals. A LiDAR signal can be emitted to and received from any direction such that LiDAR point clouds (or "LiDAR images") of the areas ahead of, to the side, and behind the vehicle 200 can be captured and stored as LiDAR point clouds. In some embodiments, the vehicle 200 may include multiple LiDAR systems and point cloud data from the multiple systems may be stitched together.

The radar system 232 may estimate strength or effective mass of an object, as objects made out of paper or plastic may be weakly detected. The radar system 232 may be based on 24 GHz, 77 GHz, or other frequency radio waves. The radar system 232 may include short-range radar (SRR), mid-range radar (MRR), or long-range radar (LRR). One or more sensors may emit radio waves, and a processor can process received reflected data (e.g., raw radar sensor data).

In some embodiments, the system inputs from the camera system 220, the LiDAR system 222, and the radar system 232 may be fused (e.g., in the perception module 202). The LiDAR system 222 may include one or more actuators to modify a position and/or orientation of the LiDAR system 222 or components thereof. The LiDAR system 222 may be configured to use ultraviolet (UV), visible, or infrared light to image objects and can be used with a wide range of targets. In some embodiments, the LiDAR system 222 can be used to map physical features of an object with high resolution (e.g., using a narrow laser beam). In some examples, the LiDAR system 222 may generate a point cloud and the point cloud may be rendered to visualize the environment surrounding the vehicle 200 (or object(s) therein). In some embodiments, the point cloud may be rendered as one or more polygon(s) or mesh model(s) through, for example, surface reconstruction. Collectively, the radar system 232, the LiDAR system 222, and the camera system 220 may be referred to herein as "imaging systems."

The GNSS receiver 208 may be positioned on the vehicle 200 and may be configured to determine a location of the vehicle 200 via GNSS data, as described herein. The GNSS receiver 208 may be configured to receive one or more signals from a global navigation satellite system (GNSS) (e.g., GPS system) to localize the vehicle 200 via geolocation. The GNSS receiver 208 may provide an input to and otherwise communicate with the mapping/localization module 204 to, for example, provide location data for use with one or more digital maps, such as an HD map (e.g., in a vector layer, in a raster layer or other semantic map, etc.). In some embodiments, the GNSS receiver 208 may be configured to receive updates from an external network.

The IMU 224 may be an electronic device that measures and reports one or more features regarding the motion of the vehicle 200. For example, the IMU 224 may measure a velocity, acceleration, angular rate, and or an orientation of the vehicle 200 or one or more of its individual components using a combination of accelerometers, gyroscopes, and/or magnetometers. The IMU 224 may detect linear acceleration using one or more accelerometers and rotational rate using one or more gyroscopes. In some embodiments, the IMU 224 may be communicatively coupled to the GNSS receiver 208 and/or the mapping/localization module 204, to help determine a real-time location of the vehicle 200, and predict a location of the vehicle 200 even when the GNSS receiver 208 cannot receive satellite signals.

The transceiver 226 may be configured to communicate with one or more external networks 260 via, for example, a wired or wireless connection in order to send and receive information (e.g., to a remote server 270). The wireless connection may be a wireless communication signal (e.g., Wi-Fi, cellular, LTE, 5g, etc.) In some embodiments, the transceiver 226 may be configured to communicate with external network(s) via a wired connection, such as, for example, during initial installation, testing, or service of the autonomy system 250 of the vehicle 200. A wired/wireless connection may be used to download and install various lines of code in the form of digital files (e.g., HD digital maps), executable programs (e.g., navigation programs), and other computer-readable code that may be used by the system 250 to navigate the vehicle 200 or otherwise operate the vehicle 200, either fully-autonomously or semi-autonomously.

The processor 210 of autonomy system 250 may be embodied as one or more of a data processor, a microcontroller, a microprocessor, a digital signal processor, a logic circuit, a programmable logic array, or one or more other devices for controlling the autonomy system 250 in response to one or more of the system inputs. The autonomy system 250 may include a single microprocessor or multiple microprocessors that may include means for controlling the vehicle 200 to switch lanes, monitoring and detecting other vehicles, and activating acknowledgment sequences. Numerous commercially available microprocessors can be configured to perform the functions of the autonomy system 250. It should be appreciated that the autonomy system 250 could include a general machine controller capable of controlling numerous other machine functions. Alternatively, a special-purpose machine controller could be provided. Further, the autonomy system 250, or portions thereof, may be located remote from the system 250. For example, one or more features of the mapping/localization module 204 could be located remote of the vehicle 200. Various other known circuits may be associated with the autonomy system 250, including signal-conditioning circuitry, communication circuitry, actuation circuitry, and other appropriate circuitry.

Figure 5:
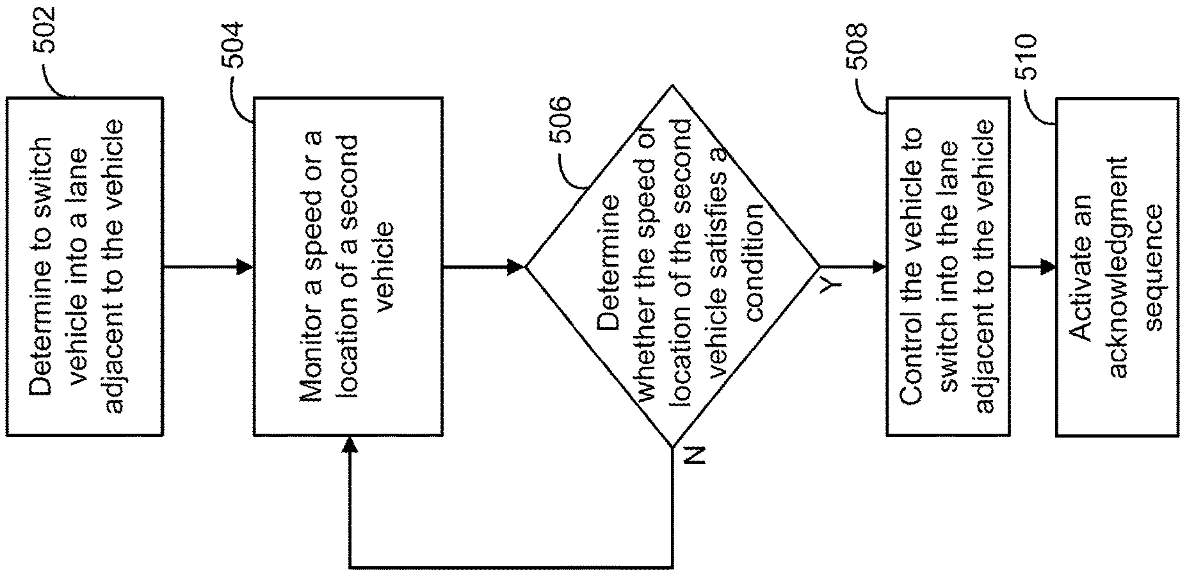
FIG. 5 is a method for external actor acknowledgment for automated vehicles, according to an embodiment.

The memory 214 of autonomy system 250 may store data and/or software routines that may assist the autonomy system 250 in performing its functions, such as the functions of the perception module 202, the mapping/localization module 204, the vehicle control module 206, an acknowledgment sequence module 230, and the method 500 described herein with respect to FIG. 5. Further, the memory 214 may also store data received from various inputs associated with the autonomy system 250, such as perception data from the perception system.

As noted above, the perception module 202 may receive input from the various sensors, such as the camera system 220, the LiDAR system 222, the GNSS receiver 208, and/or the IMU 224 (collectively "perception data") to sense an environment surrounding the vehicle 200 and interpret it. To interpret the surrounding environment, the perception module 202 (or "perception engine") may identify and classify objects or groups of objects in the environment. For example, the vehicle 102 may use the perception module 202 to identify one or more objects (e.g., pedestrians, vehicles, debris, etc.) or features of the roadway 106 (e.g., intersections, road signs, lane lines, etc.) before or beside a vehicle and classify the objects in the road. In some embodiments, the perception module 202 may include an image classification function and/or a computer vision function.

The system 100 may collect perception data. The perception data may represent the perceived environment surrounding the vehicle, for example, and may be collected using aspects of the perception system described herein. The perception data can come from, for example, one or more of the LiDAR system, the camera system, the radar system, (e.g., as described herein with reference to FIG. 3) and various other externally-facing sensors and systems on board the vehicle (e.g., the GNSS receiver, etc.). For example, on vehicles having a sonar or radar system, the sonar and/or radar systems may collect perception data. As the vehicle 102 travels along the roadway 106, the system 100 may continually receive data from the various systems on the vehicle 102. In some embodiments, the system 100 may receive data periodically and/or continuously. With respect to FIG. 1, the vehicle 102 may collect perception data that indicates presence of the lane line 110 (e.g., in order to determine the lanes 108 and 112). Additionally, the detection systems may detect vehicles 104 and monitor the vehicles 104 to estimate various properties of the vehicles 104 (e.g., proximity, speed, behavior, flashing light, etc.). The system 100 may use the various properties and features of the road to determine distance between the vehicles 104 (e.g., a gap) for merging into other lanes. The features may be stored as points (e.g., vehicles, signs, small landmarks, etc.), lines (e.g., lane lines, road edges, etc.), or polygons (e.g., lakes, large landmarks, etc.) and may have various properties (e.g., style, visible range, refresh rate, etc.), which properties may control how the system 100 interacts with the various features.

The image classification function may determine the features of an image (e.g., a visual image from the camera system 220 and/or a point cloud from the LiDAR system 222). The image classification function can be any combination of software agents and/or hardware modules able to identify image features and determine attributes of image parameters in order to classify portions, features, or attributes of an image. The image classification function may be embodied by a software module that may be communicatively coupled to a repository of images or image data (e.g., visual data and/or point cloud data) which may be used to determine objects and/or features in real time image data captured by, for example, the camera system 220 and the LiDAR system 222. In some embodiments, the image classification function may be configured to classify features based on information received from only a portion of the multiple available sources. For example, in the case that the captured visual camera data includes images that may be blurred, the system 250 may identify objects based on data from one or more of the other systems (e.g., the LiDAR system 222) that does not include the image data.

The computer vision function may be configured to process and analyze images captured by the camera system 220 and/or the LiDAR system 222 or stored on one or more modules of the autonomy system 250 (e.g., in the memory 214), to identify objects and/or features in the environment surrounding the vehicle 200 (e.g., lane lines). The computer vision function may use, for example, an object recognition algorithm, video tracing, one or more photogrammetric range imaging techniques (e.g., a structure from motion (SfM) algorithms), or other computer vision techniques. The computer vision function may be configured to, for example, perform environmental mapping and/or track object vectors (e.g., speed and direction). In some embodiments, objects or features may be classified into various object classes using the image classification function, for instance, and the computer vision function may track the one or more classified objects to determine aspects of the classified object (e.g., aspects of its motion, size, etc.)

The mapping/localization module 204 receives perception data that can be compared to one or more digital maps stored in the mapping/localization module 204 to determine where the vehicle 200 is in the world and/or or where the vehicle 200 is on the digital map(s). In particular, the mapping/localization module 204 may receive perception data from the perception module 202 and/or from the various sensors sensing the environment surrounding the vehicle 200 and may correlate features of the sensed environment with details (e.g., digital representations of the features of the sensed environment) on the one or more digital maps. The digital map may have various levels of detail and can be, for example, a raster map, a vector map, etc. The digital maps may be stored locally on the vehicle 200 and/or stored and accessed remotely.

The vehicle control module 206 may control the behavior and maneuvers of the vehicle 200. For example, once the systems on the vehicle 200 have determined its location with respect to map features (e.g., intersections, road signs, lane lines, etc.) the vehicle 200 may use the vehicle control module 206 and its associated systems to plan and execute maneuvers and/or routes with respect to the features of the environment. The vehicle control module 206 may make decisions about how the vehicle 200 will move through the environment to get to a goal or destination of the vehicle 200 as the vehicle 200 completes a mission. The vehicle control module 206 may consume information from the perception module 202 and the mapping/localization module 204 to know where the vehicle 200 is relative to the surrounding environment and what other traffic actors are doing.

The vehicle control module 206 may be communicatively and operatively coupled to a plurality of vehicle operating systems and may execute one or more control signals and/or schemes to control operation of the one or more operating systems, for example, the vehicle control module 206 may control one or more of a vehicle steering system, a propulsion system, and/or a braking system. The propulsion system may be configured to provide powered motion for the vehicle 200 and may include, for example, an engine/motor, an energy source, a transmission, and wheels/tires and may be coupled to and receive a signal from a throttle system, for example, which may be any combination of mechanisms configured to control the operating speed and acceleration of the engine/motor and thus, the speed/acceleration of the vehicle 200. The steering system may be any combination of mechanisms configured to adjust the heading or direction of the vehicle 200. The brake system may be, for example, any combination of mechanisms configured to decelerate the vehicle 200 (e.g., friction braking system, regenerative braking system, etc.) The vehicle control module 206 may be configured to avoid obstacles in the environment surrounding the vehicle 200 and may be configured to use one or more system inputs to identify, evaluate, and modify a vehicle trajectory. The vehicle control module 206 is depicted as a single module but can be any combination of software agents and/or hardware modules able to generate vehicle control signals operative to monitor systems and control various vehicle actuators. The vehicle control module 206 may include a steering controller and for vehicle lateral motion control and a propulsion and braking controller for vehicle longitudinal motion.

In some examples, the vehicle control module 206 may decide to switch from the lane 112 into the adjacent lane 108 (e.g., cross over the lane line 110). To do so, the vehicle control module 206 may activate a turn indicator to indicate the vehicle will merge into the adjacent lane 108. In some cases, a vehicle 104 may slow down to create space for the vehicle 200 to merge into the lane 108. The vehicle 104 may flash front lamps to indicate that the vehicle 104 has created the space and will maintain the space for the vehicle 200 to merge. The perception module 202 may monitor the vehicle 104. The perception module 202 can detect that the speed and location of the vehicle 104 is sufficient (e.g., satisfies a condition) for the vehicle 200 to merge into the lane 108. The vehicle 200 may switch from the lane 112 to the lane

108 (e.g., merge) and activate an acknowledgment sequence to express appreciation to the vehicle 104 (e.g., thank the vehicle 104). An acknowledgment sequence can be an activation of a device or physical component of or located on a vehicle (e.g., the vehicle 102) that changed lanes that causes an indication that is visible and/or audible to a vehicle behind and/or in front of the vehicle after changing lanes to appear (e.g., a flashing of one or more lamps of the vehicle, honking of a horn, etc.). Adjacent can mean to share a lane line (e.g., the lane 112 is adjacent to the lane 108 as they share the lane line 110) with another vehicle, that two vehicles are driving the same direction on a road, or that two vehicles are on the same road.

The acknowledgment sequence module 230 may control the activation of the acknowledgment sequence. For example, the acknowledgment sequence module 230 may determine that the condition for activation has been satisfied (e.g., sufficient space (e.g., a gap with a size or length above a threshold) to merge lanes, flashing lights from the vehicle 104, a speed of the vehicle 104 below a threshold, a location of the vehicle 104 is at least a set distance behind the vehicle 200, etc.). Responsive to determining the condition is satisfied, the acknowledgment sequence module 230 may activate one or more lamps a contiguous number of times (e.g., flash the lamps). In some cases, the acknowledgment sequence module 230 may be communicatively and operatively coupled to a plurality of vehicle operating systems and may execute one or more control signals and/or schemes to control operation of the one or more operating systems, for example, the acknowledgment sequence module 230 may control a lighting system to activate and deactivate one or more lamps located at various surfaces of the vehicle 200.

Figure 3:
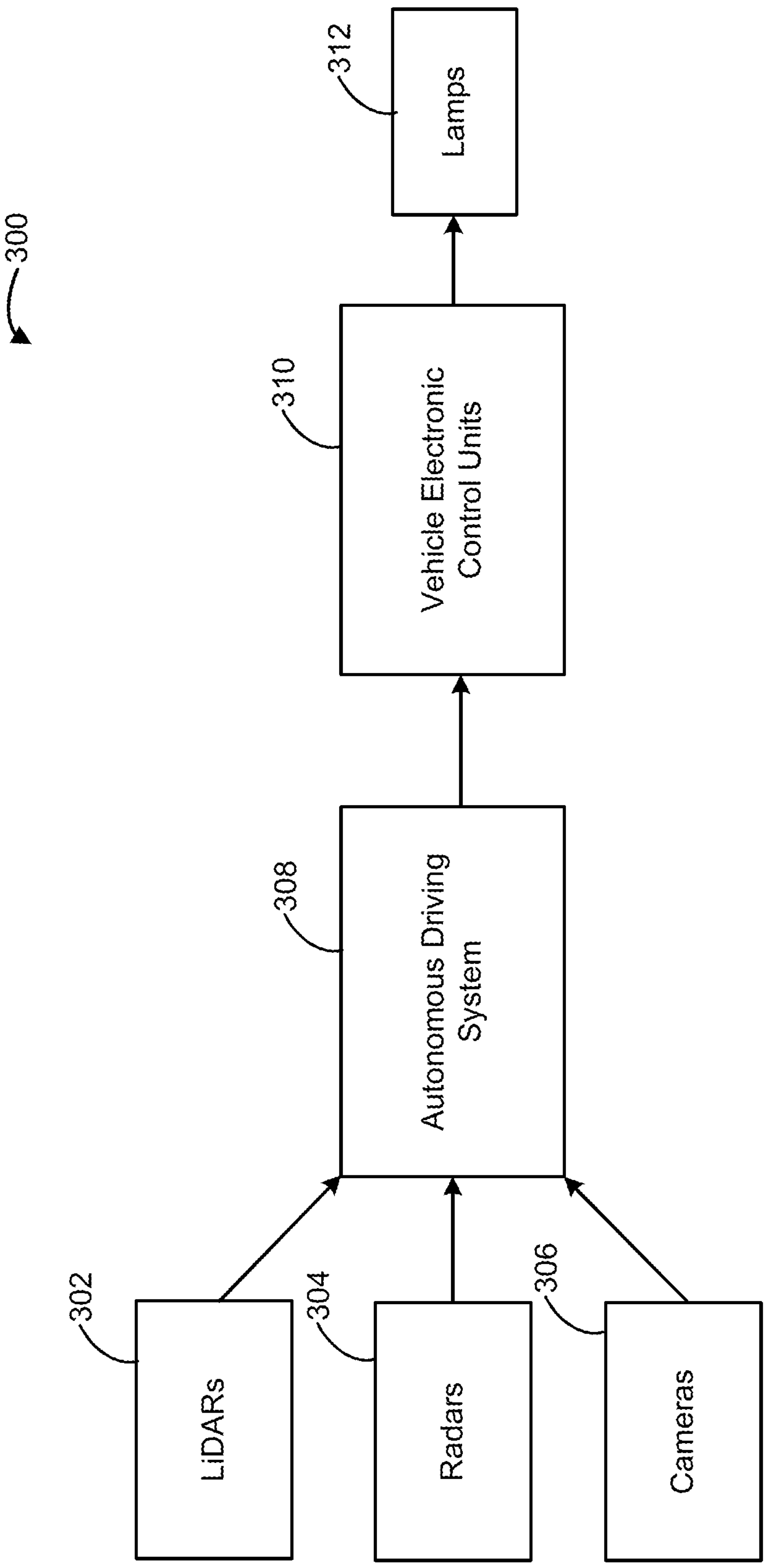
FIG. 3 is a flow diagram of a process for external actor acknowledgment for automated vehicles, according to an embodiment.

FIG. 3 is a flow diagram of a process 300 for external actor (e.g., other vehicles, drivers of other vehicles, etc.) acknowledgment for automated vehicles. The process 300 can be performed by a data processing system (e.g., a vehicle 102, an autonomy system 114 or 250, a network 120, a server 122, etc., as shown and described with reference to FIGS. 1 and 2). The process 300 may include more or fewer operations and the operations may be performed in any order.

At operations 302, 304, and 306, various sensors may detect and track (e.g., monitor) other vehicles. For example, with reference to FIGS. 1 and 2, a vehicle 102 may include a LiDAR system 222, a radar system 232, and/or a camera system 220. The data processing system may be configured to detect and track a second vehicle 104 from data collected via the LiDAR system 222, the radar system 232, and/or the camera system 220. In some cases, the data processing system may detect and track the vehicle 104 after activating a turn indicator responsive to determining to switch lanes (e.g., merge into another lane).

At operation 308, an automated driving system (e.g., the autonomy system 114, 250) may collect the data from the various sensors and determine behavior based on the collected data. In a first example, the data processing system may determine that a speed, a location, or a behavior (e.g., intentionally creating space to merge, unintentionally creating space, etc.) of the other vehicles does not satisfy a condition or a distance between two other vehicles (e.g., a gap) does not satisfy the condition. For example, the other vehicle may be decelerating, but may still be at a location that does not provide sufficient space for the vehicle 102 to merge. The data processing system may determine to maintain the turn indicator active, accelerate the vehicle 102, decelerate the vehicle 102, maintain the speed of the vehicle 102, or any combination thereof. In a second example, the data processing system may determine that the speed, the location, or the behavior of the other vehicles or a distance between the two other vehicles satisfy the condition. For example, the condition may include the ability for the vehicle 102 to safely (e.g., without hitting another object, without endangering other vehicles, abiding by the rules of the road, etc.) merge into the adjacent lane. The data processing system may execute motion and vehicle control to control the vehicle 102 to switch into a lane adjacent to the vehicle 102.

At operation 310, the data processing system may activate an acknowledgment sequence. The data processing system may determine that the other vehicle created space based on detecting and tracking the other vehicle over time. For example, the data processing system may monitor the other vehicle from the moment the data processing system determines to switch lanes. The data processing system may identify that the other vehicle made space for the vehicle 102 to merge into the lane based on the vehicle slowing down (e.g., slowing down subsequent to the vehicle activating a turn signal) and/or that there is gap between the other vehicle and an object (e.g., another vehicle) in front of the other vehicle with a distance that exceeds a threshold. Additionally, in some cases, the data processing system may detect, via the camera system 220, flashing lights. For example, the other vehicle may create room for the vehicle 102 to merge and flash headlamps of the other vehicle to signal to the vehicle 102 that the other vehicle will maintain distance for the vehicle 102 to merge safely, indicating an intent of the other vehicle. In some cases, the data processing system may determine the condition is satisfied responsive to detecting the flashing lights of the other vehicle. For example, the condition may include detecting the flashing lights after the other vehicle has created sufficient room for the vehicle 102 to merge.

Responsive to determining the condition is satisfied (e.g., the other vehicle intentionally allowed the vehicle 102 to merge), at operation 312, the data processing system may activate the acknowledgment sequence. The data processing system may activate the acknowledgment sequence further response to controlling the vehicle 102 to merge into the lane. Examples of acknowledgment sequences include, but are not limited to, flashing lights, honking a horn, changing a display (e.g., an electronic monitor), etc. In the example of the flashing lights, the data processing system can activate one or more lamps associated with the vehicle 102 via vehicle electronic control units. For example, the data processing system can activate the one or more lamps by flashing lamps of the vehicle 102. The lamps may be marker lamps located at a back surface of the vehicle 102 (e.g., backlights, taillights, etc.). In some cases, the lamps may flash a number of times (e.g., sequential or contiguous times) to conform with a roadway practice of indicating appreciation (e.g., three times). In some cases, the data processing system may express appreciation to the other vehicle by activating the acknowledgment sequence responsive to merging into the lane.

FIGS. 4A, 4B, 4C, and 4D are example illustrations of a bird's eye view of roadways 400, 401, 402, and 403, according to an embodiment. The roadways 400, 401, 402, and 403 may include a first lane 410, a second lane 414, a lane line 412 in between the two lanes 410 and 414, and vehicles 404, 406, and 408. In some cases, the vehicles 406 and 408 may be external actors to the vehicle 404 and the vehicle 404 may be an automated vehicle.

Figure 4A:
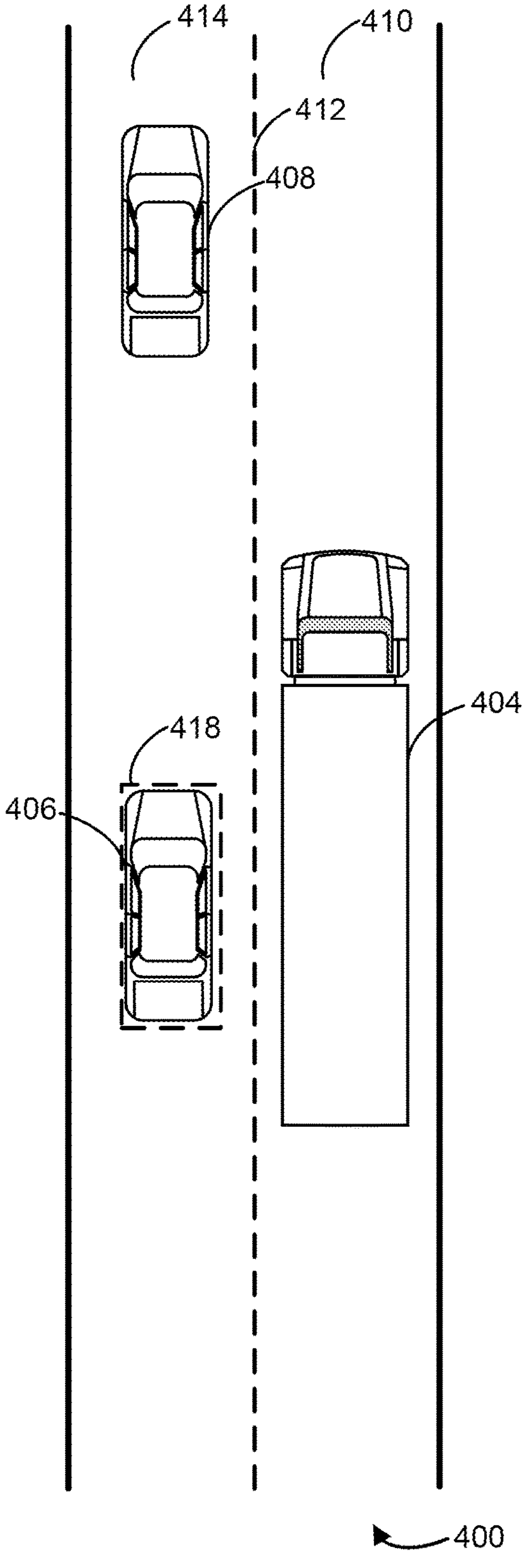
FIGS. 4A-4D are example illustrations of a bird's eye view of a roadway, according to an embodiment.

With reference to FIG. 4A, the vehicle 404 may determine to change lanes. For example, the vehicle 404 may determine that a route to a destination includes switching from the lane 410 into the lane 414 (e.g., an adjacent lane). The vehicle 404 may detect the second vehicle 406 and the third vehicle 408 responsive to determining to switch into the lane 414. In some cases, the vehicle 404 may detect the second vehicle 406 from data collected via a LiDAR system, a radar system, or a camera system. The vehicle 404 may determine that a location 418 of the second vehicle 406 does not satisfy a condition for switching into the lane 414 (e.g., the vehicle 406 is in the way of the vehicle 404 switching into the lane 414) and continue to monitor the second vehicle 406.

Figure 4B:
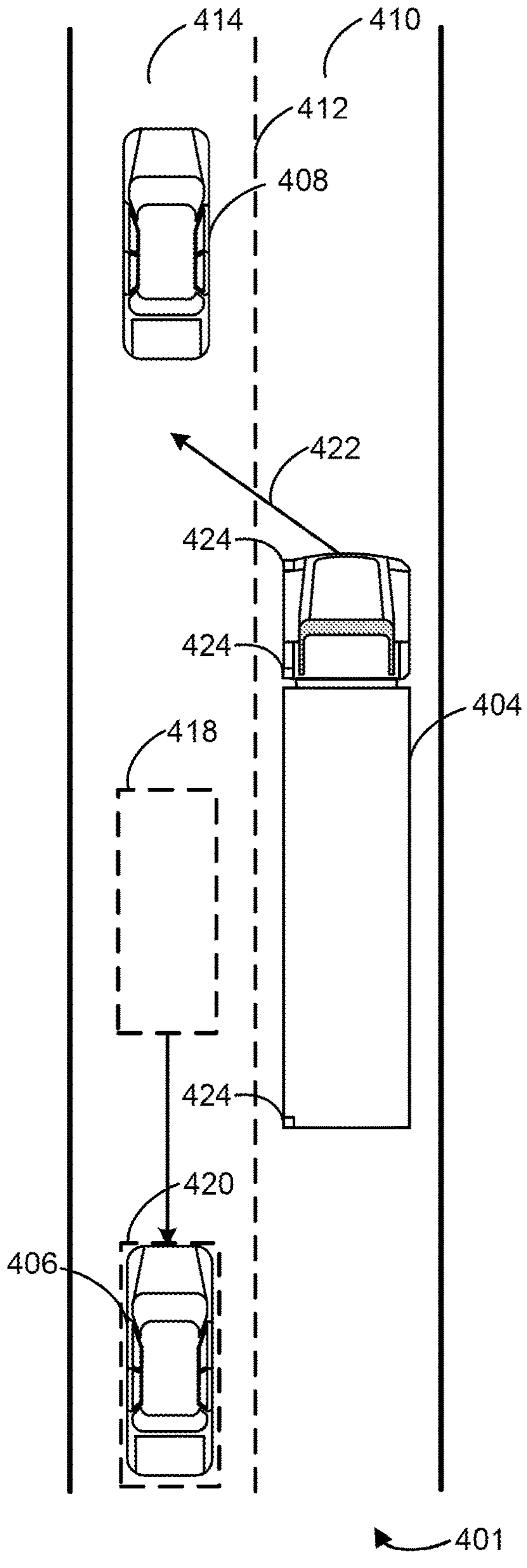

With reference to FIG. 4B, the vehicle 404 may activate a turn indicator. For example, the vehicle 404 may activate one or more lamps 424 (e.g., turn signal lamps) located at a side surface (e.g., a left side, a driver's side) of the vehicle 404 to show intent to the second vehicle 406 that the vehicle 404 has determined to switch lanes. The second vehicle 406 may identify the turn indicators and move from the location 418 to location 420. In some cases, the vehicle 404 may detect that the second vehicle 406 has satisfied a condition to merge into the lane 414 by creating space for the vehicle 404 (e.g., via a reduced speed, a new location, a behavior, of the second vehicle 406). The vehicle 404 may begin to move in a direction 422 to merge into the lane 414 responsive to determining that the condition has been satisfied.

Figure 4C:
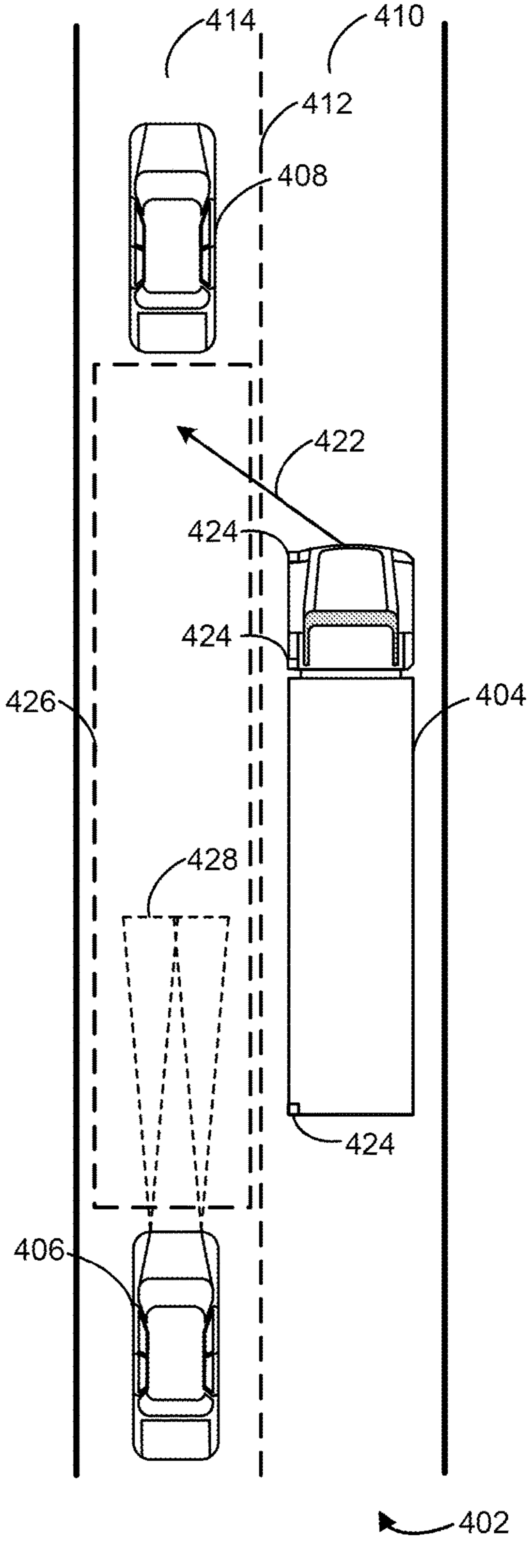

Additionally, or alternatively, with reference to FIG. 4C, the vehicle 404 may detect that the condition has been satisfied by a gap 426 between the second vehicle 406 and the third vehicle 408 or by flashing lights 428 form the second vehicle 406. For example, the vehicle 404 may monitor a distance between the second vehicle 406 and the third vehicle 408 in front of the second vehicle 406 (e.g., the gap 426). When the gap 426 is sufficiently large for the vehicle 404 to safely merge into the lane 414, the vehicle 404 may determine that the condition to merge has been satisfied. In another example, the vehicle 404 may detect, via one or more sensors, flashing lights 428 of the second vehicle 406. After creating space for the vehicle 404 by moving to the location 420, the second vehicle 406 may indicate an intent to maintain the space (e.g., the gap 426) and allow the vehicle 404 to merge (e.g., as a show of good intent, as part of being a good citizen of the road) by flashing headlights associated with the second vehicle 406. Responsive to detecting the flashing lights 428, the vehicle 404 may determine the condition has been satisfied and switch into the lane 414.

Figure 4D:
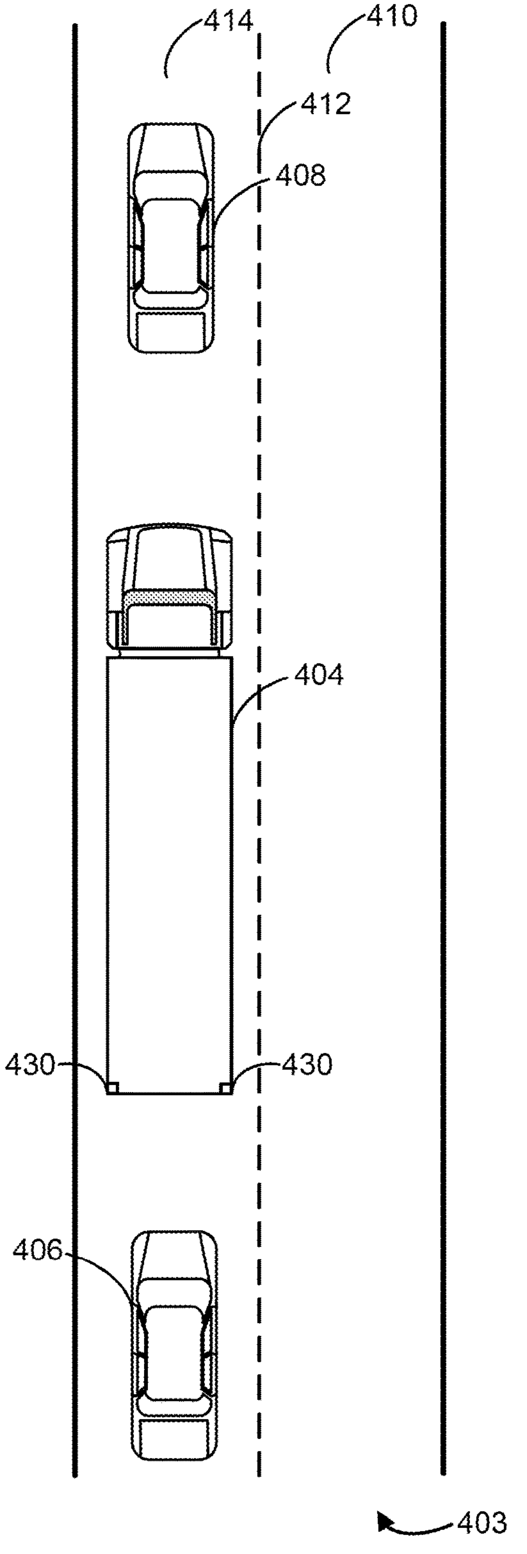

With reference to FIG. 4D, the vehicle 404 may activate an acknowledgment sequence. The vehicle 404 may activate the acknowledgment sequence by activating one or more lamps 430 of the vehicle 404. The lamps 430 may be the same as or different from the lamps 424. For example, the lamps 430 may be located at a back surface of the vehicle 404 and visible to the second vehicle 406. The vehicle 404 may flash the lamps 430 (e.g., each of the lamps 430) multiple times (e.g., three times, a number of times as is common to indicate appreciation) to indicate to the second vehicle 406 appreciation for (e.g., acknowledgment of) the behavior of the second vehicle 406 (e.g., creating space for the vehicle 404 to merge safely). In some cases, the vehicle 404 may activate the acknowledgment sequence responsive to determining the vehicle 404 has switched into the lane 414, detecting the flashing lights 428, determining that the condition has been satisfied, or any combination thereof.

FIG. 5 is an illustration of a method 500 for external actor acknowledgment for automated vehicles. The method can be performed by a data processing system (e.g., a vehicle 102, an autonomy system 114 and 250, a network 120, a server 122, etc., as shown and described with reference to FIGS. 1 and 2). The method 500 may include more or fewer operations and the operations may be performed in any order. Performance of the method 500 may enable the data processing system to express appreciation to external actors, which may result in improved interactions between the automated vehicles and external actors.

At operation 502, the data processing system may determine to control a vehicle to switch into a lane adjacent to the automated vehicle. The data processing system may determine to switch into the adjacent lane to complete a route or trajectory assigned to or determined for the automated vehicle. At operation 504, responsive to determining to control the vehicle to switch into the lane, the data processing system may monitor a speed or a location of a second vehicle. The second vehicle may be located in the lane adjacent to the vehicle. In some cases, the second vehicle may impede the vehicle to switch into the adjacent lane safely.

At operation 506, the data processing system may determine whether the speed or location of the second vehicle satisfies a condition. For example, if the location of the second vehicle is sufficiently behind the vehicle and/or if the speed of the second vehicle is sufficiently low (e.g., below a threshold) to allow for the vehicle to safely merge into the lane, then the data processing system may continue to operation 508. However, if the location or speed of the second vehicle will not allow the vehicle to safely merge into the lane (e.g., the second vehicle is not sufficiently behind the vehicle or the speed of the second vehicle is too high (e.g., above a threshold), then the data processing system may continue to monitor the speed and the location of the second vehicle at operation 504. In some examples, the data processing system may monitor a gap (e.g., a distance) between the second vehicle and a third vehicle in front of the second vehicle. The data processing system may do so to determine if a condition is satisfied (e.g., the gap is sufficiently large enough, such as above a threshold distance, for the vehicle to merge into the adjacent lane). In some cases, the data processing system may detect flashing lights from the second vehicle and determine that the condition has been satisfied responsive to detecting the flashing lights.

At operation 508, the data processing system may control the vehicle to switch into the lane adjacent to the vehicle. The data processing system may do so responsive to determining the condition related to the speed, location, and/or gap of the second vehicle is satisfied. At operation 510, the data processing system may activate an acknowledgment sequence responsive to determining the vehicle has switched into the lane. In some examples, the data processing system may activate the acknowledgment sequence by activating one or more lamps (e.g., each turn signal or break light) located at a back surface of the vehicle. For example, the data processing system may flash the lamps multiple times to indicate appreciation for the intent and behavior of the second vehicle (e.g., creating space for the vehicle to merge).

The various illustrative logical blocks, modules, circuits, and algorithm steps described in connection with the embodiments disclosed herein may be implemented as electronic hardware, computer software, or combinations of both. To clearly illustrate this interchangeability of hardware and software, various components, blocks, modules, circuits, and steps have been generally described in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc, where "disks" usually reproduce data magnetically, while "discs" reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A first vehicle, comprising:

a sensor; and one or more processors, wherein the one or more processors are configured to:

determine to switch the first vehicle from a driving lane of the first vehicle into an adjacent lane of the driving lane;

responsive to determining to switch the first vehicle into the adjacent lane, monitor a speed or a location of a second vehicle, the second vehicle in the adjacent lane;

determine the speed or the location of the second vehicle satisfies a condition;

detect flashing lights of the second vehicle, wherein determining the condition is satisfied is further based on detection of the flashing lights of the second vehicle, wherein detection of the flashing lights of the second vehicle indicates that the second vehicle provides space in the adjacent lane for the first vehicle to switch from the driving lane into the adjacent lane;

responsive to determining the condition is satisfied, control the first vehicle to switch from the driving lane into the adjacent lane; and activate an acknowledgment sequence of the first vehicle responsive to determining the first vehicle has switched from the driving lane into the adjacent lane.

2. The first vehicle of claim 1, further comprising:

a lamp, wherein the one or more processors are configured to activate the acknowledgment sequence by activating the lamp responsive to determining the first vehicle has moved into the adjacent lane.

3. The first vehicle of claim 2, wherein the lamp is located at a back surface of the first vehicle; and wherein the one or more processors are configured to:

activate the acknowledgement sequence by flashing the lamp multiple times.

4. The first vehicle of claim 1, wherein the one or more processors are configured to activate the acknowledgment sequence responsive to detecting the flashing lights.

5. The first vehicle of claim 1, wherein the one or more processors are further configured to detect the second vehicle subsequent to determining to control the first vehicle to switch into the adjacent lane.

6. The first vehicle of claim 5, further comprising:

a LiDAR system, a radar system, or a camera system, wherein the one or more processors are configured to detect the second vehicle from data collected via the LiDAR system, the radar system, or the camera system.

7. The first vehicle of claim 1, further comprising:

a turn indicator;

wherein the one or more processors are further configured to:

activate the turn indicator responsive to determining to switch into the adjacent lane.

8. The first vehicle of claim 1, wherein the one or more processors are further configured to:

detect a third vehicle in front of the second vehicle; and monitor a gap between the second vehicle and the third vehicle, wherein the one or more processors are configured to determine the condition is satisfied based on the gap.

9. A method, comprising:

determining, by one or more processors, to switch a first vehicle from a driving lane of the first vehicle into an adjacent lane of the driving lane;

responsive to determining to switch the first vehicle into the adjacent lane, monitoring, by the one or more processors, a speed or a location of a second vehicle, the second vehicle in the adjacent lane;

determining, by the one or more processors, the speed or the location of the second vehicle satisfies a condition;

detecting flashing lights of the second vehicle, wherein determining the condition is satisfied is further based on detection of the flashing lights of the second vehicle, wherein detection of the flashing lights of the second vehicle indicates that the second vehicle provides space in the adjacent lane for the first vehicle to switch from the driving lane into the adjacent lane;

responsive to determining the condition is satisfied, controlling, by the one or more processors, the first vehicle to switch from the driving lane into the adjacent lane; and activating, by the one or more processors, an acknowledgment sequence of the first vehicle responsive to determining the first vehicle has switched from the driving lane into the adjacent lane.

10. The method of claim 9, wherein activating the acknowledgment sequence further comprises activating, by the one or more processors, a lamp of the first vehicle responsive to determining the first vehicle has moved into the adjacent lane.

11. The method of claim 10, further comprising activating, by the one or more processors, the acknowledgement sequence by flashing the lamp multiple times, wherein the lamp is located at a back surface of the first vehicle.

12. The method of claim 9, wherein activating the acknowledgment sequence further comprises activating, by the one or more processors, the acknowledgment sequence responsive to detecting the flashing lights.

13. The method of claim 9, further comprising detecting, by the one or more processors, the second vehicle subsequent to determining to control the first vehicle to switch into the adjacent lane.

14. The method of claim 13, further comprising detecting, by the one or more processors, the second vehicle from data collected via a LiDAR system, a radar system, or a camera system.

15. A non-transitory computer readable medium including one or more instructions stored thereon and executable by a processor to:

determine to switch a first vehicle from a driving lane of the first vehicle into an adjacent lane of the driving lane;

responsive to determining to switch the first vehicle into the adjacent lane, monitor a speed or a location of a second vehicle, the second vehicle in the adjacent lane;

determine the speed or the location of the second vehicle satisfies a condition;

detect flashing lights of the second vehicle, wherein determining the condition is satisfied is further based on detection of the flashing lights of the second vehicle;

responsive to determining the condition is satisfied, control the first vehicle to switch from the driving lane into the adjacent lane; and activate an acknowledgment sequence of the first vehicle responsive to determining the first vehicle has switched from the driving lane into the adjacent lane.

16. The non-transitory computer readable medium of claim 15, wherein the one or more instructions to activate the acknowledgment sequence further include one or more instructions executable by the processor to activate a lamp of the first vehicle responsive to determining the first vehicle has moved into the adjacent lane.

17. The non-transitory computer readable medium of claim 16, wherein the one or more instructions to activate the acknowledgment sequence further include one or more instructions executable by the processor to activate the acknowledgement sequence by flashing the lamp multiple times, wherein the lamp is located at a back surface of the first vehicle.

* * * * *